3,072,483
PHOTOGRAPHIC ELEMENT COMPRISING POLYETHYLENE TEREPHTHALATE FILM BASE
Donald J. Trevoy and Richard A. Phillips, Rochester, N.Y., assignors to Eastman Kodak Company, Rochester, N.Y., a corporation of New Jersey
No Drawing. Filed Dec. 22, 1958, Ser. No. 781,854
2 Claims. (Cl. 96—87)

This invention relates to the manufacture of polyethylene terephthalate film base having improved adhesion to substrates, more particularly improved adhesion to gelatin based photographic elements.

Photographic film support made from polyethylene terephthalate has a relatively hydrophobic surface, and does not adhere well to hydrophilic coatings containing gelatin. Because the terephthalate surface is relatively chemically inert, it is not dissolved by customarily used coating solvents, and therefore a mechanical interlocking of coating and support cannot be readily obtained.

The practice has been in preparing terephthalate film base to stretch the film in two directions after it has been extruded in order to give it improved tensile strength and crystallization in processes known as drafting and tentering. In order to sub a terephthalate film base, a sub has been applied to the support before the terephthalate has been stretched, or after the terephthalate has been stretched in one direction. The film has then been stretched to obtain the desired biaxial orientation and heat set. This is a rigorous treatment for a subbing to withstand, and it has been desirable to find a method of subbing the terephthalate following the steps of stretching and heat-setting. This would permit heat-setting on heated rolls with smaller and simpler equipment than now required. Another advantage is that a higher temperature could be used in heat-setting, thereby increasing the degree of crystallization without danger of altering the surface of a subbing layer in such a way as to decrease its adhesion to the gelatin-containing layer which is subsequently coated.

We have discovered a method treating the terephthalate film surface which renders it more hydrophilic and permits the surface to be subbed following the drafting, tentering and heat-setting steps which is simple to use and easy to control comprising treating the surface with an oxidizing flame.

One object of this invention is to provide an improved polyethylene terephthalate film base to which a photographic emulsion adheres with improved tenacity. Another object is to provide a method of making a polyethylene terephthalate film base hydrophilic. A further object is to provide a method of treating polyethylene terephthalate film base so that it will have good tensile strength, a high degree of crystallization and improved adhesion to subbing layers which can be applied to anchor photographic silver halide emulsions. A further object is to provide an improved polyethylene terephthalate film base which shows good adhesion to antistatic layers, abrasion-resistant layers, anticurl layers, and other backing layers.

The above objects are obtained by flaming the surface of polyethylene terephthalate film base with an oxidizing flame having a temperature of 1600°–3800° F. for a fraction of a second, at the same time keeping the rear surface of the film cooled at a temperature of 45°–80° F. Using this method, the film base can be treated at a rate of 10–150 feet per minute.

After the film base has been flamed by subjecting the surface for a fraction of a second to an open flame, the film base can be coated with a substrate comprising a polymeric material selected from those which are known for coating the terephthalate before or following the first stretching operation. Typical subs are disclosed in U.S. Patents 2,794,742; 2,779,684; 2,703,290 and the like. Moreover, certain gelatin-containing layers show excellent adhesion when applied directly to the flamed polyethylene terephthalate surface.

Another advantage of flaming polyethylene terephthalate is in the application of antistatic agents which are particularly necessary for use with terephthalate film base. In the presence of static electricity, static tracks on the photographic emulsions may make it unfit for photographic purposes. These antistatic coatings may be applied over a flamed surface without the preliminary subbing which was formerly required. Typical antistatic layers are disclosed in U.S. Patents 2,725,297; 2,717,834; etc.

An oxidizing flame is required in order to effectively treat the terephthalate base. This flame can be obtained using a Bunsen burner which has been adjusted to provide a large proportion of air to gas so that the flame is considered noisy. It will be obvious that other gases than illuminating gas may be used to provide the oxidizing flame that oxygen-gas mixtures are also effective and that other arrangements may be used such as a manifold providing a multiplicity of flames, or an orifice providing a continuous flame across the web.

Various supports for the film base may be provided during the flaming operation, such as a vacuum plate for single sheets or a suitable rotating drum for continuous treatment. In order to maintain the back of the film support at a cooled temperature, the drum can be cooled internally.

The following examples are intended to illustrate our invention but are not intended to limit it in any way.

Example 1

A sheet of fully processed polyethylene terephthalate 0.005" thick was mounted on a vacuum coating table. The coating table was inverted and carried manually through the oxidizing cone of the flame of a Bunsen burner at a linear speed of about 2 feet per second. The treated area was found to be readily wet by water, and exhibited a receding contact angle, by the bubble method, of 5° or less, compared with 58° for the untreated support. The dry treated surface was coated with a 6% solution of a copolymer of methyl acrylate-vinylidene chloride-itaconic acid in cyclohexanone, and dried in air. It was then cured at 155° C. for 10 minutes to remove final trace of solvent. Adhesion of the copolymer layer was excellent when determined by a tape test in which a strip of plastic electrical tape was pressed firmly to the surface and stripped off rapidly. With unflamed support the copolymer coating was removed from the support in the same test.

Example 2

A sheet of polyethylene terephthalate was flamed and subbed with copolymer as in Example 1, then subsequently coated with a gelatin wash containing chromic chloride and saponin. Adhesion of the double coating was excellent when subjected to the tape test. Without flaming, adhesive failure occurred at the polyethylene terephthalate interface.

Example 3

A sheet of polyethylene terephthalate was flamed as in Example 1, then coated with an aqueous dispersion or hydrosol of the copolymer used in Example 1. After air-drying at room temperature, the coating was cured at 155° C. for 10 minutes. Again the adhesion of the subbing layer to flamed support was excellent, but the coating stripped readily from unflamed support.

Example 4

A sheet of polyethylene terephthalate was flamed as in Example 1, coated with the hydrosol form of the copolymer, dried and cured as in Example 3. When a gelatin wash was subsequently applied to the subbed support and dried, the adhesion to the flamed surface was greatly improved over that on unflamed support.

Example 5

Coatings on flamed polyethylene terephthalate were prepared as in Example 1, but using suitable organic or aqueous solutions of other carboxyl-containing polymers or copolymers such as polyvinyl phthalate, a copolymer of hexyl-acrylate-vinyl chloride-acrylic acid, orange shellac, a copolymer of methyl acrylate-acrylic acid, a copolymer of methacrylic acid-methyl methacrylate, polyvinyl cinnamate phthalate, carboxylated polyvinyl acetate, a copolymer of styrene-maleic acid, and certain copolymers of ethyl acrylate-acrylic acid. Adhesion of these coatings on flamed support was greatly improved over that on unflamed support.

Example 6

Coatings on flamed polyethylene terephthalate were prepared as in Example 1, but using suitable organic or aqueous solutions of polymer containing functional groups other than carboxyl, including various polyvinyl acetates, partially-hydrolzed polyvinyl acetates, polyacrylonitrile, various polyamides, a styrene-butadiene copolymer, polyvinyl chalcone, a copolymer of methyl acrylate-vinylidene chloride, polyvinyl-2-pyridine, polyvinyl-4-pyridine, polyvinyl cinnamate, various copolymers having vinyl chloride as a major constituent, certain alkyds, and polyvinylpyrolidone. Again the coatings showed improved adhesion on the flamed surface.

Example 7

A sheet of polyethylene terephthalate was flamed as in Example 1, and coated directly with an aqueous gelatin wash solution containing chromic chloride and saponin. Adhesion of the dried coating was excellent by the tape test, while stripping of the coating occurred readily when coated on unflamed support.

Example 8

A sheet of polyethylene terephthalate was flamed as in Example 1, and coated directly with a 2% solution of gelatin in ethylene chlorohydrin. Adhesion of the dried coating was excellent on flamed support, poor on unflamed support.

Example 9

A sheet of polyethylene terephthalate was flamed as in Example 1, and coated directly with a cross-linkable, cationic, antistatic agent. Adhesion of the dried coating was excellent on flamed support, poor on unflamed support.

Example 10

A sheet of polyethylene terephthalate was flamed as in Example 1, and coated directly with gelatin wash solution in which the solvent was 50% water and 50% tetrahydrofuran. Adhesion of the dried coating was excellent on flamed support, poor on unflamed support.

Example 11

A solution containing 14 ml. of 10% gelatin, 1 ml. of 7.5% saponin, and 10 ml. of water was added to 5 ml. of a medium-speed silver bromoiodide emulsion and the mixture was coated to a wet thickness of 0.006 inch on the subbed film support described in Example 1 and dried. The coating was then exposed under an image and develops in a N-methyl-p-aminophenol (or metol)-hydroquinone developing composition to form a negative silver image. The residual silver halide was removed with hypo, leaving a permanent negative silver image. Color emulsions containing incorporated couplers may also be coated on this support and processed to yield dye images.

We claim:

1. A photographic element comprising:
   (a) a polyethylene terephthalate film base a surface of which has been subjected to an oxidizing flame having a temperature of 1600–3800° F. for a fraction of a second, while maintaining the reverse surface at a temperature of 45–80° F., until the contact angle of the surface measured with water has been reduced to approximately 5°,
   (b) a methyl acrylate-vinylidene chloride-itaconic acid copolymer substrate coated on said flame treated surface, and
   (c) a gelatino-silver halide emulsion layer coated on the subbing layer.

2. A method of preparing a photographic film containing a polyethylene terephthalate film base comprising:
   (a) extruding the film base, stretching it in two directions and heat-setting,
   (b) flaming the film base with an oxidizing flame having a temperature of 1600–3800° F. for a fraction of a second while maintaining the reverse side at a temperature of 45–80° F., until the contact angle of the surface measured with water has been reduced to approximately 5°,
   (c) subbing the film base with a methyl acrylate-vinylidene chloride-itaconic acid copolymer substrate, and
   (d) coating a gelatino-silver halide emulsion over the substrate.

References Cited in the file of this patent

UNITED STATES PATENTS

| | | |
|---|---|---|
| 2,632,921 | Kreidl | Mar. 31, 1953 |
| 2,647,836 | Patten | Aug. 4, 1953 |
| 2,648,097 | Kritchever | Aug. 11, 1953 |
| 2,767,103 | Loukomsky | Oct. 16, 1956 |
| 2,805,173 | Ambler | Sept. 3, 1957 |
| 2,876,187 | Wolinski | Mar. 3, 1959 |
| 2,893,896 | Beeber et al. | July 7, 1959 |
| 2,943,937 | Nadeau et al. | July 5, 1960 |

FOREIGN PATENTS

| | | |
|---|---|---|
| 1,159,702 | France | Mar. 3, 1959 |
| 788,365 | Great Britain | Jan. 2, 1958 |